March 23, 1943.   D. F. BEEGLE   2,314,439
ASPARAGUS TOP CUTTER
Filed April 27, 1942   2 Sheets-Sheet 1

Daniel F. Beegle
INVENTOR
BY Victor J. Evans & Co.
ATTORNEYS

March 23, 1943.  D. F. BEEGLE  2,314,439
ASPARAGUS TOP CUTTER
Filed April 27, 1942   2 Sheets-Sheet 2

Daniel F. Beegle, INVENTOR
BY Victor J. Evans & Co.
ATTORNEYS

Patented Mar. 23, 1943

2,314,439

UNITED STATES PATENT OFFICE 2,314,439

ASPARAGUS TOP CUTTER

Daniel F. Beegle, Kennewick, Wash.

Application April 27, 1942, Serial No. 440,686

7 Claims. (Cl. 56—60)

My invention relates to new and useful improvements in machines for cutting and comminuting growing plants.

An important object of my invention is the provision of a device of this character that is self-contained, the various adjuncts thereof being mounted on a movable frame and including a novel means for severing the plant stalks that can be quickly vertically adjusted whereby to adapt it to stalks having various physical characteristics and to the particular nature of the terrain over which the device is moved, such adjustment in no way interfering with the continuous operation of the device.

Another object of my invention is the provision of a device of the above-mentioned character that is essentially simple in its construction, the number of parts required being reduced to a minimum and the several adjuncts being uniquely associated and correlated to provide a maximum efficiency in operation.

Still another object of my invention is the provision of a device of the above-mentioned character wherein the respective adjuncts comprising the same are operative to first sever the stalks of the plants from the root portions thereof, to thereafter gather and compress the stalks and to feed the same to a crushing drum, the said crushing drum breaking up the fibres of the stalks and preparing them for a cutter means which receives and comminutes the same for dissemination on the ground, all of the above operations being simultaneously and continuously performed whereby to greatly expedite the entire procedure.

Other objects and advantages of my invention will be apparent during the course of the following description.

Figure 1:
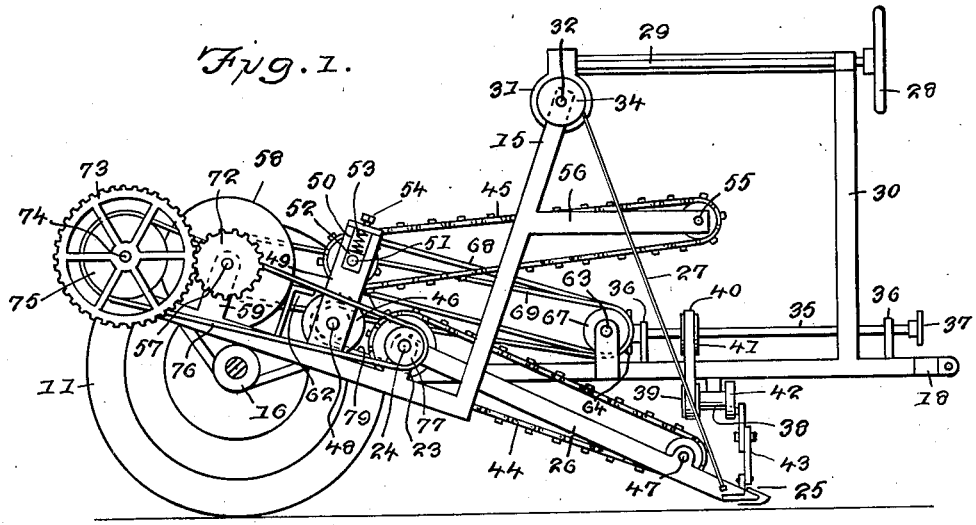
Figure 2:
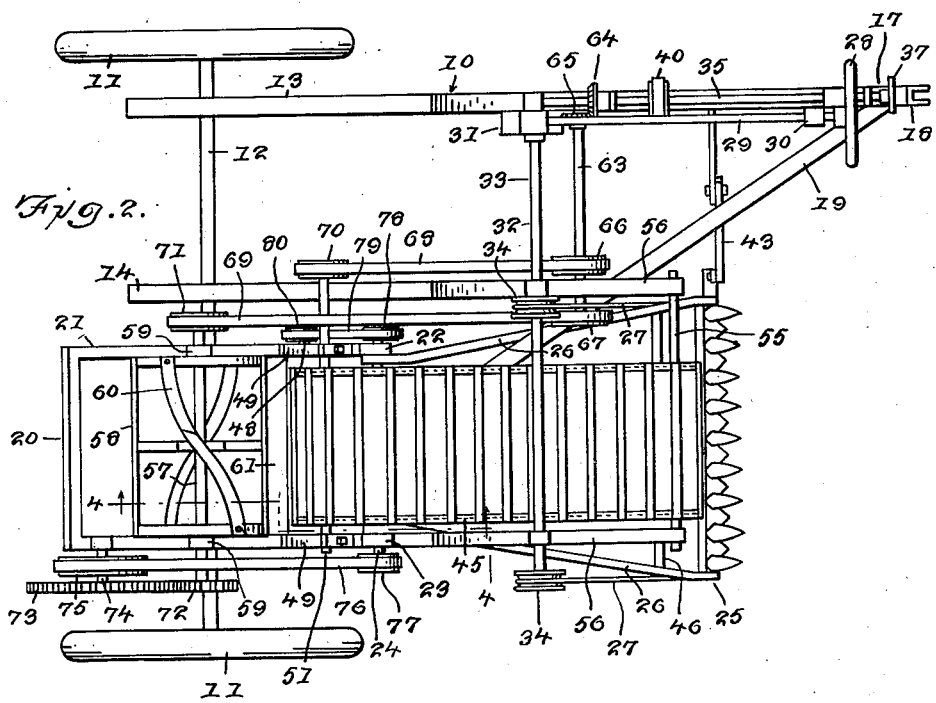
Figure 3:
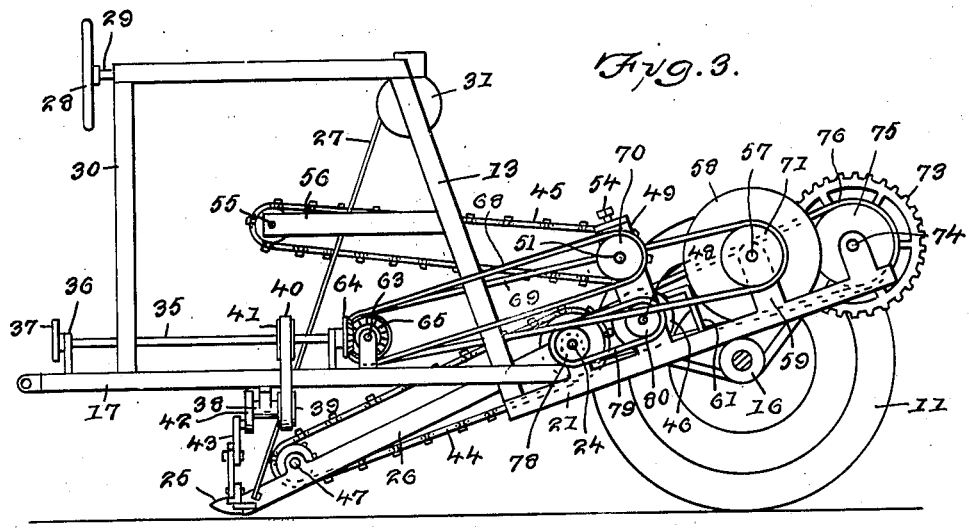
Figure 4:
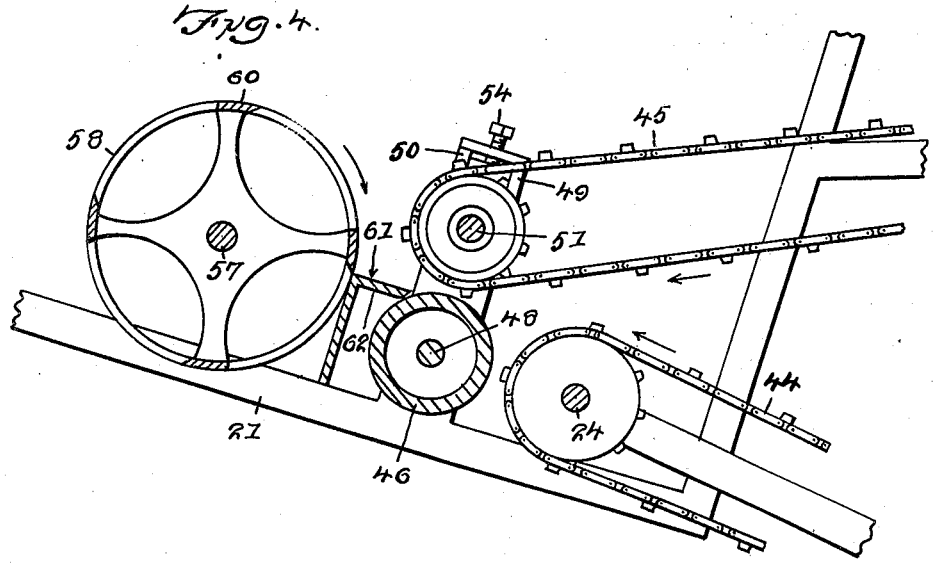

In the drawings, forming a part of this specification, and wherein like numerals are employed to designate like parts throughout the same, Figure 1 is a side elevation of a device embodying my invention, Figure 2 is a top plan view thereof, Figure 3 is an elevation of the device taken from the side opposed to the side illustrated in Figure 1, and Figure 4 is an enlarged fragmentary longitudinal sectional view taken on the line 4—4 of Figure 2.

In the accompanying drawings, wherein for the purpose of illustration, is shown a preferred embodiment of my invention, the numeral 10 designates the main supporting frame of the device, the rearward end of the frame being supported by the wheels 11 mounted on the transversely extending axle 12. The frame includes three L-shaped supporting members 13, 14 and 15 arranged in spaced parallel relation and having the ends of the horizontal portions thereof formed with bearings 16 which rotatably accommodate the axle 12. The upstanding portions of the supporting members are arranged forwardly of the axle and for the purpose of properly positioning the respective adjuncts of the device, all of the supporting members are inclined angularly forwardly and downwardly from the axle, as clearly illustrated in the drawings.

The draw bar 17 is fixedly connected to the supporting member 13 and in such relation therewith that it will extend in substantially parallel relation with the ground when the respective supporting members are inclined in the manner described above. The draw bar extends substantially forwardly of the supporting members and the forward end thereof is provided with a clevis 18, or the like, by means of which the frame may be coupled to a tractor. The diagonally arranged brace member 19 extends from the forward end of the draw bar and connects with the supporting members in a manner to support the forward end of the draw bar and to assure an essentially rigid, unitary frame structure.

The supporting member 15 is formed at its rearward end with a transversely extending integral portion 20, which portion extends to a point in proximity to the intermediate supporting member 14 and integrally connects with a supplemental supporting piece 21 which extends forwardly thereof in spaced parallel relation with the supporting members. If desired, the supporting piece may be provided with a suitable bearing 16 and thus be securely supported by the axle 12. The forward end of the supporting piece 21 and the supporting member 15 are formed with transversely aligning standards 22 and 23 which rotatably receive the shaft 24 and a suitable sickle bar 25 has the arm portions 26 thereof pivotally attached to the shaft at the inner sides of the standards. The pivotal attachment of the arms of the sickle bar with the shaft will permit the sickle bar to be raised or lowered and I propose to hold the same in a selected adjusted position relative to the ground by means of the draw cords 27.

It is desirable that means be provided which will permit the sickle bar to be adjusted from a point adjacent to the driver's seat. When the draw bar is connected to the tractor the operator will be positioned above and to one side of the forward end thereof. I have therefore mounted the hand wheel 28 in a position readily accessible to the operator, the operating shaft 29 thereof being journaled in a standard 30 formed on the forward end of the draw bar and in the rearwardly located upstanding portion of the frame supporting member 13. Obviously, by locating the hand wheel in this manner, the operator may readily reach the same with one hand and impart rotation thereto to raise or lower the sickle bar.

The end of the shaft 29 remote from the hand wheel is formed with a worm (not shown) which is suitably journaled for rotation in a worm and gear housing 31. The housing is mounted on the upper end of the upstanding arm of the frame supporting member 15 whereby the shaft 32 extending transversely of the frame and journaled in the upper ends of the upstanding portions of the three supporting members 13, 14 and 15 will be arranged so that the end 33 thereof will extend into the housing to permit a worm gear (not shown) fixedly mounted thereon to mesh with the worm formed on the shaft 29. Thus, manual rotation of the hand wheel by the operator will act through the medium of the worm and worm gear in the housing 31 to rotate the shaft 32 and to wind the upper ends of the draw cords 27 about the pulleys 34 fixedly mounted on the shaft at each side of the sickle bar. The draw cords are attached to the pulleys so that rotation thereof in one direction will raise the sickle bar and rotation thereof in the opposite direction will lower the sickle bar. Any suitable holding means may be provided for maintaining the sickle bar in a selected adjusted position relative to the ground.

The driven shaft 35 is arranged in spaced parallel relation above the draw bar and the opposite ends thereof are journaled for rotation in the bearings 36 upstanding from the draw bar. The forward end of the shaft is provided with a suitable connection 37 by means of which it may be coupled to the power take-off of the tractor. The sleeve bearing 38 hangs downwardly from the draw bar intermediate the upstanding bearings 36 and a stub shaft is rotatably mounted within the bearing. One end of the stub shaft carries a pulley 39 and an endless belt 40 connects the pulley with a pulley 41 fixedly secured on the driven shaft 35. Thus, rotation imparted to the driven shaft by the power take-off of the tractor will in turn be transmitted to the stub shaft positioned below the draw bar through the medium of the endless belt 40. The opposite end of the stub shaft is provided with a disk 42 and a longitudinally adjustable pitman 43 has one end connected to the cutter bar of the sickle bar and the other end excentrically connected to the disk 42. As the stub shaft is caused to rotate, the pitman will impart a reciprocating movement of the cutter bar of the sickle bar. The pitman is preferably formed in two pieces to permit the same to readily accommodate itself to various adjusted positions of the sickle bar relative to the ground.

A vertically spaced pair of conveyers 44 and 45 are mounted on the frame rearwardly of the sickle bar for gathering the stalks of the plants as the same are severed from the root portions by the cutter bar. The instant device has been particularly developed for the purpose of harvesting asparagus plants which, as is commonly known, are essentially fibrous and bushy in their nature. The endless conveyers are therefore arranged in forwardly divergent relation whereby to initially crush and compress the bushy asparagus plants and to deliver the same onto the crushing drum 46.

The lower conveyer 44 extends angularly forwardly and downwardly from a point slightly rearwardly of the upstanding portions of the frame supporting members to a position immediately rearwardly of the sickle bar. The upper end of the conveyer is journaled on the shaft 24 and the lower end thereof is journaled on a shaft 47, the opposite ends of which last-mentioned shaft are journaled in bearings provided in the arm portions 26 of the sickle bar assembly.

As best illustrated in Figure 4, the crushing drum is arranged directly rearwardly of the rearward end of the lower conveyer, the same being mounted on a shaft 48 extending between the transversely aligning standards 49 rising from the frame supporting member 15 and the supporting piece 21. The standards 49 extend substantially above the crushing drum, the portions thereof extending thereabove being provided with guideways 50 and the opposite ends of a shaft 51 being journaled in guide blocks 52 which travel in the guideways. The rearward end of the upper conveyer 45 is mounted on the shaft 51 and spring means 53 tensioned by the set screws 54 are disposed within the guideways above the guide blocks to normally urge the guide blocks downwardly whereby to hold the rearward end of the upper conveyer normally in proximity to the crushing drum. The forward end of the upper conveyer extends angularly forwardly and upwardly from the shaft 51 and is mounted for rotation upon a shaft 55 extending between the arms 56 formed on the frame supporting members 14 and 15.

Attention is directed to the fact that the rearward end of the upper conveyer extends substantially beyond the rearward end of the lower conveyer. This unique correlation of the conveyers and crushing drum permits the upper conveyer to perform the double function of carrying the stalks to the crushing drum and cooperating with the drum to crush the stalks. Thus, the rearward end of the lower conveyer is located immediately in advance of the crushing drum and the rearward end of the upper conveyer is arranged substantially directly above the crushing drum. The plant stalks are compressed by the conveyers as they are carried toward the converging ends thereof and, as the plants reach the rearward end of the lower conveyer, they will fall upon the crushing drum and pass between the periphery of the drum and the superjacent rearward end of the upper conveyer. The combined action of the drum and conveyer will break up the fibres of the plant stalks and deliver the same to a rotary cutter mounted rearwardly thereof. If the plants should jam between the drum and the rearward end of the upper conveyer the guide blocks 52 supporting the mentioned end of the conveyer may shift within the guideways 50 against the resilient action of the spring means 53 to permit the obstruction to pass beyond the crushing drum. It is obvious that, as soon as the obstruction has passed from between the drum and conveyer, the spring means will again urge the conveyer to the initial position in proximity to the drum.

The supporting spindle 57 of the rotary cutter 58 has the opposite ends thereof journaled in the standards 59 upstanding from the frame supporting member 15, and supporting piece 21, respectively. As best illustrated in Figure 4, the rotary cutter is arranged directly rearward of the crushing drum and the peripheral cutting blades 60 thereof cooperate with a shear plate 61 in comminuting the plant stalks discharged from between the crushing drum and upper conveyer. The shear plate extends upwardly from the frame in substantially tangential relation to the cutter and a portion 62 thereof extends at right angles in a direction away from the rotary cutter to terminate in proximity to the periphery of the crushing drum. The edge of the shear plate, formed at the juncture of the right-angularly disposed portions thereof, is the portion which coacts with the blades 60 of the rotary cutter in comminuting the plant stalks. It is readily apparent that the portion 62 of the shear plate will form a shelf along which the crushed plants discharging from the roller 46 may slide preparatory to their deliverance to the rotary cutter.

The conveyers, crushing drum and rotary cutter are driven from the shaft 35. The driven shaft 63 journaled on the frame extends transversely from the rearward end of the shaft 35 and the shaft 35 has a driven connection therewith through the medium of the beveled gears 64 and 65. Pulleys 66 and 67 are mounted on the shaft 63 and endless belts 68 and 69 extend from the pulleys to the pulleys 70 and 71 mounted on the shaft 51 and the spindle 57 of the rotary cutter, respectively. Thus, rotation of the shaft 63 will impart rotation to the upper conveyer and rotary cutter in the direction of the arrows in Figure 4. The spindle of the rotary cutter is also provided with a driving gear 72 which meshes with the substantially larger gear 73 carried by the stub shaft 74 journaled on the frame rearwardly of the cutter. A pulley 75 is also mounted on the stub shaft and an endless belt 76 extends from the pulley to a pulley 77 carried by the shaft 24 which supports the rearward end of the lower conveyer. The shaft 24 also carries a pulley 78 and an endless belt 79 extends from this pulley to a pulley 80 mounted on the shaft 48 of the crushing drum 46.

It may thus be seen that the shaft 35 will drive the shaft 63 and that endless belts 68 and 69 will drive the upper conveyer and the rotary cutter, respectively, and that the rotary cutter will, in turn, operate through the medium of the endless belt 79 to rotate the crushing drum 46. Obviously, sprockets and sprocket chains may be used in place of pulleys and belts, if desired.

As is well known to those skilled in the art, asparagus plants are frequently used to supply humus to the soil. The usual procedure is to cut the plants with a mower, rake the stalks into windrows and to thereafter heap the same into stacks. The stalks of asparagus stalks are then passed through an ensilage cutter and loaded on a suitable spreader for dissemination on the land to be treated. It is my thought to provide a machine which is particularly adapted to perform all of these operations simultaneously and I have mounted and correlated the several parts of the machine in such relation with each other as to reduce to a minimum the number of parts required and in a manner to most efficiently and effectively use the parts required. Thus, the upper conveyer not only cooperates with the lower conveyer to gather and compress the stalks severed by the sickle bar, but it is also uniquely arranged to cooperate with the crushing drum to break up the stalks delivered thereto by both conveyers. The compact arrangement of the several parts positions the cutter substantially directly behind the threshing drum and the unique formation and positioning of the shear plate provides a means for receiving the crushed stalks from the drum and for delivering the same to the cutter where they are finely comminuted. The comminuted particles of the stalks will be disseminated in a substantially even manner by the cutter on the ground over which the machine is passed.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having described my invention, I claim:

1. A harvester comprising a wheeled frame, cutter means mounted on the forward end of the frame for severing the stalk portions of growing plants, a crushing drum mounted on the frame rearwardly of the cutter means, a pair of vertically spaced forwardly divergent endless conveyers interposed between the cutter means and the said drum for gathering the stalks from the cutter means and feeding the same to the drum, the rearward end of the lower conveyer being disposed immediately in front of the drum and the rearward end of the upper conveyer being located directly above the drum to cooperate therewith in crushing the stalks, a rotary cutter located rearwardly of the crushing drum, a shear plate extending between the rotary cutter and the said drum, said plate providing means for transferring the stalks from the drum to the cutter and cooperating with the cutter to comminute the said stalks, and drive means having a driving connection with the said drum, cutters and transferring means.

2. In a harvester device, a wheeled frame, a crushing drum mounted on the frame, a pair of superposed endless conveyers supported on the frame in advance of the said drum, the rearward end of the lower conveyer being disposed immediately in front of the drum and the rearward end of the upper conveyer being located directly above the drum for coaction therewith, yieldable means urging the last-mentioned end of the upper conveyer toward the drum but permitting movement thereof in a direction away from the drum, the said conveyers being forwardly divergent and the forward end of the lower conveyer being arranged in proximity with the ground, and cutter means carried by the frame in advance of the last-mentioned end of the lower conveyer.

3. A harvester comprising a wheeled frame, a crushing drum mounted on the frame, a pair of superposed endless conveyers supported on the frame in advance of the said drum, the rearward end of the lower conveyer being disposed immediately in front of the drum and the rearward end of the upper conveyer being located directly above the drum for coaction therewith, yieldable means urging the last-mentioned end of the upper conveyer toward the drum but permitting movement thereof in a direction away from the drum, a rotary cutter mounted on the frame rearwardly of the crushing drum, a shear plate extending between the crushing drum and the said cutter, and drive means having a driving connection with the said drum, conveyers and cutter.

4. A harvester comprising a wheeled frame, a crushing drum mounted on the frame, a pair of superposed endless conveyers supported on the frame in advance of the said drum, the rearward ends of the lower conveyer being disposed immediately in front of the drum and the rearward end of the upper conveyer being located directly above the drum, the said conveyers being forwardly divergent and the forward end of the lower conveyer being arranged in proximity with the ground, a sickle bar carried by the frame in advance of the last-mentioned end of the lower conveyer, a rotary cutter mounted on the frame rearwardly of the crushing drum, a shear plate extending between the crushing drum and the said cutter, and drive means having a driving connection with the said sickle bar, drum, conveyers and cutter.

5. A harvester comprising a wheeled frame, a crushing drum mounted on the frame, a pair of superposed endless conveyers supported on the frame in advance of the said drum, the rearward ends of the lower conveyer being disposed immediately in front of the drum and the rearward end of the upper conveyer being located directly above the drum, a rotary cutter mounted on the frame rearwardly of the crushing drum, a shear plate extending between the crushing drum and the said cutter, and drive means having a driving connection with the said drum, conveyers and cutter.

6. In a harvester device, a wheeled frame, a crushing drum mounted on the frame, a pair of superposed endless conveyors mounted on the frame in advance of said drum, the rear end of the lower conveyor being disposed immediately in front of the drum and the rear end of the upper conveyor being located directly above the drum for co-operation therewith, adjustable yielding means urging the last mentioned end of the upper conveyor towards the drum but permitting the movement thereof in a direction away from the drum, the said conveyors being forwardly divergent and the forward end of the lower conveyor being arranged in proximity to the ground, cutter means carried by the frame in advance of the last mentioned end of the lower conveyor, and a rotary cutter in rear of the crushing drum.

7. In a harvester device, a wheeled frame, a crushing drum mounted on the frame, a pair of superposed forwardly divergent endless conveyors supported on the frame in advance of the drum, the rear end of the lower conveyor being disposed immediately in front of the drum and the rear end of the upper conveyor being located directly above the drum for co-operation therewith, adjustable yielding means for urging the last mentioned end of the upper conveyor towards the drum but permitting the movement thereof in a direction away from the drum, cutter means carried by the frame in advance of the last mentioned end of the lower conveyor, a shear plate arranged in a plane with the upper end of the drum, and a rotary cutter co-operating with said shear plate.

DANIEL F. BEEGLE.